United States Patent
Tashima et al.

(10) Patent No.: US 9,395,271 B2
(45) Date of Patent: *Jul. 19, 2016

(54) ABNORMALITY DETECTION DEVICE FOR INTERNAL COMBUSTION ENGINE

(75) Inventors: Kazuchika Tashima, Toyota (JP); Naoya Okubo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 395 days.

This patent is subject to a terminal disclaimer.

(21) Appl. No.: 13/881,060

(22) PCT Filed: Dec. 28, 2010

(86) PCT No.: PCT/JP2010/073761
§ 371 (c)(1),
(2), (4) Date: Apr. 23, 2013

(87) PCT Pub. No.: WO2012/090316
PCT Pub. Date: Jul. 5, 2012

(65) Prior Publication Data
US 2013/0268209 A1    Oct. 10, 2013

(51) Int. Cl.
*G01N 31/00* (2006.01)
*G01M 15/04* (2006.01)
*F02D 41/00* (2006.01)
*F02D 41/22* (2006.01)

(52) U.S. Cl.
CPC .......... *G01M 15/04* (2013.01); *F02D 41/0025* (2013.01); *F02D 41/222* (2013.01); *F02D 2200/0611* (2013.01); *Y02T 10/40* (2013.01)

(58) Field of Classification Search
CPC .............. F02D 41/0025; F02D 41/222; F02D 2200/0606; F02D 2200/0611; F02M 37/0082; Y02T 10/40

USPC ............................ 702/25; 123/445; 73/114.38
See application file for complete search history.

(56) References Cited

U.S. PATENT DOCUMENTS 7,950,269 B2 * 5/2011 Maeda ................ F02D 41/0025
73/114.45
8,683,853 B2 * 4/2014 Wakao ................ F02D 41/0025
73/114.42

(Continued)

FOREIGN PATENT DOCUMENTS

| JP | H4203434 A | 7/1992 |
| JP | A-5-79432 | 3/1993 |
| JP | 3011605 B | 12/1999 |
| JP | A-2000-303898 | 10/2000 |

(Continued)

OTHER PUBLICATIONS

Feb. 27, 2014 Notice of Allowance issued in U.S. Appl. No. 13/519,633.

*Primary Examiner* — An Do
(74) *Attorney, Agent, or Firm* — Oliff PLC (57) ABSTRACT

The present invention provides an abnormality detection device in which the fuel property sensor is disposed in a branch flow path which is such that there is a time where the fuel in the branch flow path drops out therefrom between one start of the internal combustion engine and the next start. An output value of the fuel property sensor generated when the fuel is flowing through the branch flow path is acquired as a first sensor output value. An output value of the fuel property sensor generated when the fuel in the branch flow path drops out therefrom is acquired as a second sensor output value. The first sensor output value and the second sensor output value are used as judgment data to judge whether the fuel property sensor is abnormal.

12 Claims, 6 Drawing Sheets (56) References Cited

U.S. PATENT DOCUMENTS

| | | | | |
|---|---|---|---|---|
| 8,763,587 B2 * | 7/2014 | Wakao | ............... | F02D 33/006 123/445 |
| 2009/0303466 A1 | 12/2009 | Arakawa et al. | | |
| 2009/0314071 A1 * | 12/2009 | Mukai | ............... | F02D 19/0623 73/114.38 |

FOREIGN PATENT DOCUMENTS

| | | |
|---|---|---|
| JP | A-2001-336460 | 12/2001 |
| JP | A-2008-14741 | 1/2008 |
| JP | A-2009-91991 | 4/2009 |
| JP | 2009191650 A | 8/2009 |
| JP | A-2010-38052 | 2/2010 |

* cited by examiner

ABNORMALITY DETECTION DEVICE FOR INTERNAL COMBUSTION ENGINE

TECHNICAL FIELD

The present invention relates to an abnormality detection device for an internal combustion engine whose operation is controlled in accordance with the properties of an employed fuel, and more particularly to an abnormality detection device capable of detecting an abnormality of a fuel property sensor used for fuel property determination.

BACKGROUND ART

An internal combustion engine capable of using fuels having different properties is mounted in the so-called FFVs (flexible-fuel vehicles). Ethanol-blended gasoline may be typically used for such an FFV internal combustion engine. When ethanol-blended gasoline is used as a fuel for an internal combustion engine, it is necessary to adjust air-fuel ratio in accordance with the concentration of the ethanol in the fuel because ethanol greatly differs from gasoline in calorific value per unit volume. Therefore, internal combustion engines using ethanol-blended gasoline include an ethanol concentration sensor as a fuel property sensor in order to determine the properties of an employed fuel, more specifically, the ethanol concentration. Examples of sensors suitable for the ethanol concentration sensor are a capacitance sensor, an optical transmission sensor, and an optical refractive-index sensor.

The fuel's ethanol concentration measured by the ethanol concentration sensor is used as a parameter for the air-fuel ratio control of the internal combustion engine. This makes it possible not only to obtain a desired torque but also to ensure satisfactory emissions performance without regard to the ethanol concentration in the employed fuel.

As described above, the fuel property sensor in an FFV internal combustion engine plays an important role to ensure the expected performance of the internal combustion engine. However, there is no guarantee that the fuel property sensor functions normally at all times, as is the case with other sensors. Wiring disconnection, short-circuiting, sensor element deterioration, or other abnormality may occur in the fuel property sensor. If, in such an instance, the internal combustion engine is controlled by using output values of the fuel property sensor, the internal combustion engine would fail to operate appropriately in accordance with the properties of the employed fuel, resulting in the performance characteristics of the internal combustion engine such as emissions performance and fuel efficiency to be degraded.

It is therefore desirable that abnormality in the fuel property sensor is accurately detected so as to immediately take an appropriate remedial action such as repair or replacement. In view of the above circumstances, a technology disclosed in JP-A-2010-038052 (hereinafter referred to as Patent Document 1) presets an upper-limit threshold value and a lower-limit threshold value for the output value of an ethanol concentration sensor. When the output value is outside the range between the upper- and lower-limit threshold values, this technology concludes that the ethanol concentration sensor is malfunctioning. In addition, since the output value of the ethanol concentration sensor varies with fuel temperature even when the ethanol concentration is constant, this technology can change the upper- and lower-limit threshold values in accordance with the fuel temperature measured by a fuel temperature sensor.

However, the technology disclosed in Patent Document 1 cannot accurately detect abnormality in the ethanol concentration sensor in all cases. A phenomenon called "stuck" is an abnormality that is likely to occur particularly in the ethanol concentration sensor which greatly affects the control of the internal combustion engine. It is a phenomenon such that the output value of the ethanol concentration sensor becomes stuck at a fixed value. This phenomenon may occur even when the output value of the ethanol concentration sensor is between the upper- and lower-limit threshold values. Therefore, the technology disclosed in Patent Document 1 may fail to detect this phenomenon as an abnormality.

A method of detecting a capacitance temperature sensor being stuck is well-known as described in JP-A-2000-303898 (hereinafter referred to as Patent Document 2). The method described in Patent Document 2 calculates the difference between a maximum water temperature and a minimum water temperature, which are measured by the temperature sensor after startup of the internal combustion engine. If the calculated difference is small, this method concludes that the sensor is stuck. However, it is difficult to apply this method to the detection of an ethanol concentration sensor being stuck. The reason is that, unlike fuel temperature, ethanol concentration in fuel cannot be changed unless operation such as refueling is performed.

When the output characteristics of the ethanol concentration sensor relative to the fuel temperature are taken into account, as in the technology of Patent Document 1, whether the ethanol concentration sensor is stuck can be determined by checking whether the output value of the ethanol concentration sensor varies with the fuel temperature. However, if a fuel whose ethanol concentration is 0% is employed, the output value of the ethanol concentration sensor remains substantially unchanged even when the fuel temperature varies. Therefore, this method cannot determine whether the ethanol concentration in the employed fuel is 0% or the sensor is stuck.

Another method of detecting abnormality in the fuel property sensor is described in JP-A-2008-014741 (hereinafter referred to as Patent Document 3). The abnormality detection method described in Patent Document 3 presumes that the inlet of a fuel tank is provided with a measurement chamber including a fuel property sensor. It is also presumed that the fuel property sensor outputs signals of different levels depending on the presence/absence of fuel at a measurement space within the measurement chamber. When the employed configuration is as described above, no fuel stays in the measurement space during normal operation. Fuel temporarily stays in the measurement space when the fuel tank is being refueled. The signal level of the fuel property sensor then changes reflecting the presence of the fuel in the measurement space. Therefore, if the fuel property sensor does not output an appropriate signal during refueling, it can be concluded that the fuel property sensor is malfunctioning.

However, the technology described in Patent Document 3 has a problem in terms of accuracy in determining the properties of the employed fuel. The fuel properties required as information for controlling the internal combustion engine is the properties of the fuel supplied from the fuel tank to the internal combustion engine, or more specifically, the properties of the fuel injected from an injector. The fuel property sensor in the configuration set forth in Patent Document 3, however, performs determination based on the properties of the fuel supplied to the fuel tank and not those of the fuel injected from the injector. In FFV internal combustion engines, which can use fuels having different properties, the properties of the fuel in the fuel tank do not always match with those of a newly supplied fuel. Therefore, it is highly probable that the fuel properties determined by the fuel property sensor differ from the fuel properties of the fuel injected from an injector in the technology of Patent Document 3. It is therefore difficult to achieve appropriate air-fuel ratio control in accordance with the properties of an employed fuel.

Further, the technology described in Patent Document 3 cannot detect abnormality in the fuel property sensor with adequate accuracy, or more particularly, whether the fuel property sensor is stuck. If, for instance, the output value of the fuel property sensor is stuck at an output level indicative of absence of fuel in the measurement space, it is possible to detect the "stuck" of the fuel property sensor from the output level of the fuel property sensor during refueling. However, if the output value of the fuel property sensor is stuck at an output level indicative of presence of fuel in the measurement space, the output level would not change during refueling, and thus the fuel property sensor will be judged to be operating normally. In other words, the technology described in Patent Document 3 cannot detect a stuck sensor in such case.

As described above, the previously proposed abnormality detection technologies for fuel property sensors cannot detect abnormality in a fuel property sensor with adequate accuracy, or more particularly, cannot detect a stuck fuel property sensor with adequate accuracy.

PRIOR ART LITERATURE

Patent Documents

[Patent Document 1] JP-A-2010-038052
[Patent Document 2] JP-A-2000-303898
[Patent Document 3] JP-A-2008-014741
[Patent Document 4] JP-A-H05-079432
[Patent Document 5] JP-A-2001-336460
[Patent Document 6] JP-A-2009-091991

SUMMARY OF THE INVENTION

An object of the present invention is to accurately detect abnormality in a fuel property sensor, or more particularly, a stuck fuel property sensor in an internal combustion engine whose operation is controlled in accordance with the properties of an employed fuel. To achieve such an object, the present invention provides an abnormality detection device for an internal combustion engine configured as described below.

According to the abnormality detection device provided by the present invention, a sensor having a distinctive output characteristic, such as a capacitance sensor, an optical transmission sensor, or an optical refractive-index sensor, is used as a fuel property sensor for determining the alcohol concentration, heaviness, and other properties of an employed fuel. The output characteristic which those sensors have is such that the level of an output value differs depending on whether a liquid or a gas exists in a measurement section, and when fuel exists in the measurement section, the output value is determined in accordance with the properties of the fuel. According to the abnormality detection device provided by this invention, the fuel property sensor having the above-described output characteristic is not disposed in the primary flow path of a fuel flow path connecting a fuel pump to an injector, but is disposed in a branch flow path that is branched off from the primary fuel flow path. The branch flow path should be such that there is a time where the fuel therein flows out between a start of the internal combustion engine and the next start. Such a branch flow path may be newly provided for the abnormality detection device, or alternatively, an existing fuel flow path may be used as the branch flow path. For example, a fuel flow path for guiding fuel discharged from the primary flow path via a pressure-regulating valve can be used as the branch flow path. A fuel flow path connected to a jet pump for introducing the fuel into a suction opening of the fuel pump can also be used as the branch flow path.

In a situation where the fuel is flowing through the branch flow path in which the fuel property sensor is installed, the abnormality detection device acquires the output value of the fuel property sensor as a first sensor output value. Further, in a situation where the fuel in the branch flow path has flown out, the abnormality detection device acquires the output value of the fuel property sensor as a second sensor output value. Preferably, the first sensor output value is acquired between the actuation of the fuel pump upon the start of the internal combustion engine and the stop of the fuel pump upon the stop of the internal combustion engine: that is, during a period where the fuel pump is delivering fuel from the primary flow path to the branch flow path. Further, the second sensor output value is preferred to be acquired between the stop of the internal combustion engine and the start of the internal combustion engine: that is, during a period where the fuel pump is not delivering fuel from the primary flow path to the branch flow path.

The abnormality detection device then judges, in accordance with the first and second sensor output values, whether the fuel property sensor is normal. The judgment may be conducted by comparing the difference between the first and second sensor output values against a predetermined reference difference, and then judging whether the fuel property sensor is normal in accordance with the result of the comparison. If the difference between the first and second sensor output values is smaller than the reference difference, this method concludes that the fuel property sensor is abnormal.

An alternative method would be to compare the first sensor output value against a predetermined first threshold value, compare the second sensor output value against a predetermined second threshold value, and judge, in accordance with the results of the comparisons, whether the fuel property sensor is normal. If the first sensor output value is within an abnormal region defined by the first threshold value, or the second sensor output value is within an abnormal region defined by the second threshold value, this alternative method concludes that the fuel property sensor is abnormal.

Another alternative method would be to compare the difference between the first and second sensor output values against a predetermined reference difference, compare the first or second sensor output value against a predetermined threshold value, and judge, in accordance with the results of the comparisons, whether the fuel property sensor is normal. If the difference between the first and second sensor output values is smaller than the reference difference or either the first or second sensor output value is within an abnormal region defined by the associated threshold value, this alternative method concludes that the fuel property sensor is abnormal.

To check for abnormality, the abnormality detection device uses two sensor output values having different output levels. Therefore, even when the sensor output value is stuck at a fixed value, the abnormality detection device can accurately detect it as an abnormality. Further, the abnormality detection device is configured so that the fuel subjected to fuel property judgment by the fuel property sensor is a fuel drawn from the fuel tank by the fuel pump, as with the fuel supplied to the injector. The operation of the internal combustion engine can therefore be properly controlled when the fuel property sensor is functioning normally in accordance with the properties of the employed fuel.

If the fuel property sensor is an alcohol concentration sensor for measuring the alcohol concentration in the fuel, the following function may be added to the abnormal detection device.

The function that may be added to the abnormality detection device according to the present invention is a function of diagnosing the rationality of the alcohol concentration sensor. Usage of the above-mentioned abnormality detection method enables accurate detection of a stuck sensor. However, it should be noted that the output characteristics of a sensor may deviate even if the sensor is not stuck. In such an instance, if the output value of the alcohol concentration sensor could be verified to have no doubt according to its relationship with the output value of another sensor, it can be concluded that, at least in that relation, the output value of the alcohol concentration sensor is rational.

To be more specific, the abnormality detection device estimates the alcohol concentration in the fuel injected from the injector based on the integrated amount of fuel injected by the injector and the output value of the alcohol concentration sensor. At the same time, the abnormality detection device learns the alcohol concentration in the fuel injected from the injector by exercising air-fuel ratio feedback control in accordance with the output value of an air-fuel ratio sensor disposed in an exhaust path of the internal combustion engine. When the output value of the alcohol concentration sensor has changed due to refueling, the abnormality detection device judges whether the alcohol concentration sensor is rational by verifying whether the difference between the estimated alcohol concentration and the learned alcohol concentration is not greater than a predetermined judgment value. As far as the relationship between the output value of the air-fuel ratio sensor and the output value of the alcohol concentration sensor remains unimpaired, the difference between the estimated alcohol concentration and the learned alcohol concentration should be not greater than the judgment value.

Usage of such diagnostic method enables prompt diagnosis of the rationality of the alcohol concentration sensor. This is possible because the abnormality detection device can acquire sensor output values based on the alcohol concentration in the fuel tank by just driving the fuel pump immediately after refueling without starting the internal combustion engine.

BEST MODE FOR CARRYING OUT THE INVENTION

First Embodiment

A first embodiment of the present invention will now be described with reference to the accompanying drawings.

Figure 1:
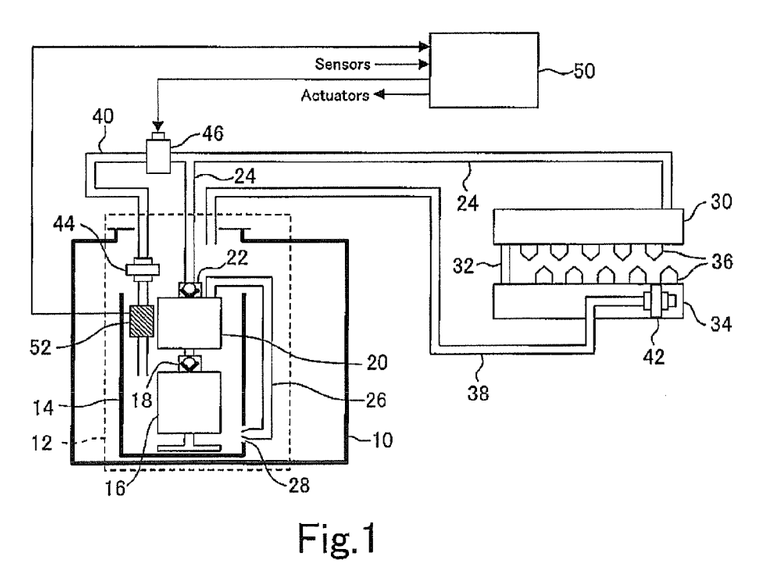
FIG. 1 is a schematic diagram illustrating the configuration of a fuel supply system for an internal combustion engine to which an abnormality detection device of a first embodiment of the present invention is applied.

An abnormality detection device according to the present embodiment is applied to FFV internal combustion engines, which can use not only gasoline but also ethanol-blended gasoline. FIG. 1 is a schematic diagram illustrating the configuration of a fuel supply system for such an internal combustion engine.

The fuel supply system shown in FIG. 1 is configured such that a fuel pump module 12 is disposed inside a fuel tank 10. The fuel pump module 12 includes a reservoir cup 14 containing an electrically-operated feed pump (fuel pump) 16 and a filter 20. The fuel pressurized by the feed pump 16 is delivered to the filter 20 through a check valve 18, and then forwarded to a main flow path 24 through a check valve 22. The fuel pump module 12 also includes a jet pump 28, which delivers the fuel outside the reservoir cup 14 to the inside of the reservoir cup 14. Part of the fuel pressurized by the feed pump 16 is diverged in the filter 20. The diverged portion of the pressurized fuel is supplied to the jet pump 28 through a jet pump flow path 26. In addition, the fuel pump module 12 also includes a low pressure regulator (pressure-regulating valve) 44 and an ethanol concentration sensor (fuel property sensor) 52.

The main flow path 24 extends out of the fuel tank 10 and connects with a delivery pipe 30 on the left bank side. This delivery pipe 30 is connected to a delivery pipe 34 on the right bank side through a communication flow path 32. Four injectors 36 are connected to each of the delivery pipes 30, 34 for the cylinders of each bank. The pressurized fuel delivered from the feed pump 16 is supplied to the delivery pipe 30 through the main flow path 24 and then injected into each cylinder on the left bank by the injectors 36. The pressurized fuel is also supplied from the delivery pipe 30 to the delivery pipe 34 through the communication flow path 32 and injected into each cylinder on the right bank by the injectors 36. In the present embodiment, the fuel flow path from the discharge port of the feed pump 16 to each injector 36, that is, the fuel flow path constituted by the filter 20, the main flow path 24, the delivery pipe 30, the communication flow path 32, and the delivery pipe 34, corresponds to "the primary flow path of the fuel flow path" in the present invention.

The trailing end of the delivery pipe 34 is connected to a first return flow path 38 extending into the fuel tank 10. The first return flow path 38 is provided with a high pressure regulator 42. The high pressure regulator 42 automatically opens when the pressure of fuel in the delivery pipe 34 becomes higher than a predetermined high relief pressure and automatically closes when the fuel pressure becomes not higher than the high relief pressure. This allows the interior of the primary flow path of the fuel flow path, the path between the discharge port of the feed pump 16 and each injector 36, to be adjusted to a predetermined high pressure defined by the high relief pressure. As the high pressure regulator 42 opens, fuel is discharged into the first return flow path 38 and the fuel returns to the fuel tank 10 therethrough.

A second return flow path 40 branches off from the main flow path 24. The second return flow path 40 extends into the fuel tank 10. The aforementioned low pressure regulator 44 is disposed in the second return flow path 40. The low pressure regulator 44 automatically opens when the fuel pressure in the main flow path 24 becomes higher than a predetermined low relief pressure and automatically closes when the fuel pressure becomes not higher than the low relief pressure. This allows the interior of the primary flow path of the fuel flow path, the path between the discharge port of the feed pump 16 and each injector 36, to be adjusted to a predetermined low pressure defined by the low relief pressure. As the low pressure regulator 44 opens, part of the pressurized fuel pumped from the feed pump 16 returns to the fuel tank 10 through the second return flow path 40.

A fuel pressure selector valve 46 is disposed upstream of the low pressure regulator 44 in the second return flow path 40. While the fuel pressure selector valve 46 is open, the fuel pressure in the main flow path 24 is exerted on the low pressure regulator 44. The low pressure regulator 44 thus functions in preference to the high pressure regulator 42 so that the fuel pressure in the primary flow path of the fuel flow path between the discharge port of the feed pump 16 and each injector 36 is adjusted to the low pressure. In this instance, no fuel is discharged to the first return flow path 38 because the high pressure regulator 42 remains closed. On the other hand, while the fuel pressure selector valve 46 is closed, the fuel pressure in the main flow path 24 is not exerted on the low pressure regulator 44 and the low pressure regulator 44 does not function. The fuel pressure in the primary flow path of the fuel flow path between the discharge port of the feed pump 16 and each injector 36 is therefore adjusted to the high pressure by the high pressure regulator.

The ethanol concentration sensor 52 is disposed downstream of the low pressure regulator 44 in the second return flow path 40. The ethanol concentration sensor 52 used in this embodiment is a capacitance sensor. The output value of the ethanol concentration sensor 52 continuously varies with the concentration of ethanol. Therefore, the ethanol concentration in the employed fuel can be measured from the output value of the ethanol concentration sensor 52. The output value of the ethanol concentration sensor 52 is input into an ECU 50 to be used as information for controlling operation of the internal combustion engine. According to the configuration of the fuel supply system of this embodiment, the fuel subjected to the ethanol concentration judgment by the ethanol concentration sensor 52 is a fuel drawn from the fuel tank 10 by the feed pump 16 as with the fuel supplied to the injectors 36. Therefore, when the ethanol concentration sensor 52 is operating normally, the operation of the internal combustion engine can be properly controlled in accordance with the ethanol concentration in the employed fuel.

The ECU 50 functions not only as a control device for controlling the operation of the internal combustion engine but also as the abnormality detection device for the internal combustion engine. When the ECU 50 functions as the abnormality detection device, detecting abnormality in the ethanol concentration sensor 52, which is a detecting item, is performed. An abnormality detection program incorporated in the ECU 50 utilizes an output characteristic of the ethanol concentration sensor 52 to check for abnormalities. The output characteristic utilized by the program is such that the level of an output value of the sensor differs depending on whether a liquid or a gas exists between the electrodes forming the measurement section. This output characteristic is peculiar to capacitance sensors. According to such output characteristic, when the ethanol concentration sensor 52 is operating normally, the sensor output value should vary between cases where fuel exists and doesn't exist between the electrodes of the ethanol concentration sensor 52. Therefore, whether the ethanol concentration sensor 52 is normally operating can be determined by comparing a sensor output value generated when fuel exists between the electrodes against a sensor output value generated when no fuel exists between the electrodes, and checking whether there is a definite difference between the compared sensor output values. If there is no difference between the compared sensor output values, it can be concluded that the ethanol concentration sensor 52 is abnormal, or more specifically, stuck.

To exercise the above-described abnormality judgment method, it is necessary to create a state where fuel exists between the electrodes of the ethanol concentration sensor 52 and a state where fuel does not exist at that section. According to the configuration of the fuel supply system for the present embodiment, such states do not need to be intentionally created because they are naturally created during normal vehicle driving.

The state where a fuel exists between the electrodes of the ethanol concentration sensor 52 is created while the feed pump 16 is operating. The fuel pressure selector valve 46 is open by default. Therefore, when the feed pump 16 operates to raise the fuel pressure, the low pressure regulator 44 opens to let the fuel flow to the position at which the ethanol concentration sensor 52 is installed. The feed pump 16 operates while the internal combustion engine is operated, that is, from the turning on of the ignition switch to the turning off of the ignition switch.

On the other hand, the state where no fuel exists between the electrodes of the ethanol concentration sensor 52 is created by turning off the ignition switch to stop the feed pump 16. When the feed pump 16 stops to lower the fuel pressure, the low pressure regulator 44 closes. Then, in the downstream of the low pressure regulator 44, the fuel in the second return flow path 40 flows out to empty the path 40, and the electrodes of the ethanol concentration sensor 52 are exposed to air.

As described above, according to the configuration of the fuel supply system for this embodiment, the data needed for abnormality judgment of the ethanol concentration sensor 52 can be obtained by acquiring the output values of the ethanol concentration sensor 52 of when the ignition switch is on and off. Thus, the ECU 50 as the abnormality detection device executes an abnormality judgment process in accordance with a routine shown in the flowchart of FIG. 2.

Figure 2:
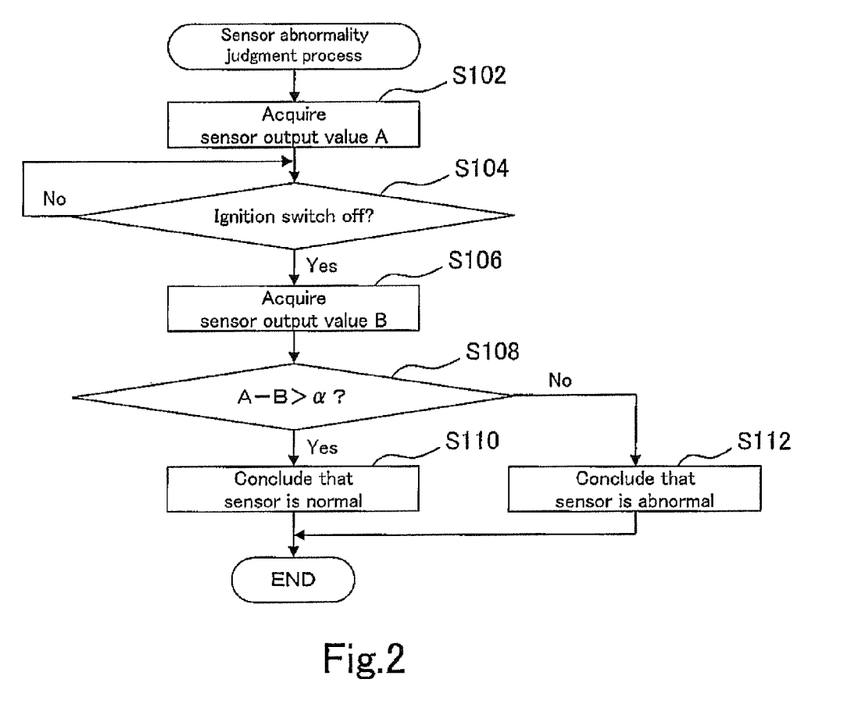
FIG. 2 is a flowchart showing a routine of an abnormality judgment process which is executed by an ECU in the first embodiment of the present invention.

The routine shown in FIG. 2 is executed each time the ignition switch is turned on to start the internal combustion engine. In step S102, which is the first step, the output value of the ethanol concentration sensor 52 is acquired when a certain amount of time has elapsed after internal combustion engine startup. The certain amount of time is a time sufficient for raising the fuel pressure so as to open the low pressure regulator 44. The sensor output value acquired here would be a sensor output value indicating presence of fuel between the electrodes of the ethanol concentration sensor 52 ("a first sensor output value" according to the present invention). This sensor output value is hereinafter referred to as a sensor output value A.

In the next step, step S104, it is judged whether the ignition switch is off. This judgment step is repeatedly performed at fixed intervals until the ignition switch is turned off.

In step S106, which is the next step of the step where the ignition switch is off, the output value of the ethanol concentration sensor 52 is acquired when a certain amount of time has elapsed after the ignition switch is turned off. The certain amount of time is a time sufficient for lowering the fuel pressure so as to close the low pressure regulator 44 and expel the fuel from the inside of the second return flow path 40. The sensor output value acquired here would be a sensor output value indicating absence of fuel between the electrodes of the ethanol concentration sensor 52 ("a second sensor output value" according to the present invention). This sensor output value is hereinafter referred to as a sensor output value B.

Next, in step S108, the difference between the sensor output value A and sensor output value B is calculated, and the calculated difference is calculated against a predetermined reference difference $\alpha$. The reference difference $\alpha$ is determined based on a presumed difference between sensor output values A and B that should be measured when the ethanol concentration sensor 52 is operating normally. When the ethanol concentration sensor 52 is operating normally, the difference between sensor output values A and B varies with the ethanol concentration in the fuel. More specifically, the difference between sensor output values A and B is minimized when the ethanol concentration is 0%. Hence, the reference difference $\alpha$ is set with reference to a gasoline having an ethanol concentration of 0%.

If the result of comparison in step S108 indicates that the difference between sensor output values A and B is greater than the reference difference $\alpha$, it is concluded in step S110 that the ethanol concentration sensor 52 is functioning normally. If, on the other hand, the difference between sensor output values A and B is not greater than the reference difference $\alpha$, it is concluded in step S112 that the ethanol concentration sensor 52 is abnormal, or more specifically, stuck.

As described above, the abnormality judgment process performed in this embodiment uses two sensor output values A and B that should have different output levels, as data for abnormality judgment. When the output value of the ethanol concentration sensor 52 is stuck at a fixed value, the stuck state is accurately detected as an abnormality.

Second Embodiment

A second embodiment of the present invention will now be described with reference to the accompanying drawings.

As with the abnormality detection device according to the first embodiment, the abnormality detection device according to the present embodiment is applied to an internal combustion engine having the fuel supply system shown in FIG. 1. Therefore, the subsequent description is based on the system shown in FIG. 1, as with the first embodiment.

Figure 3:
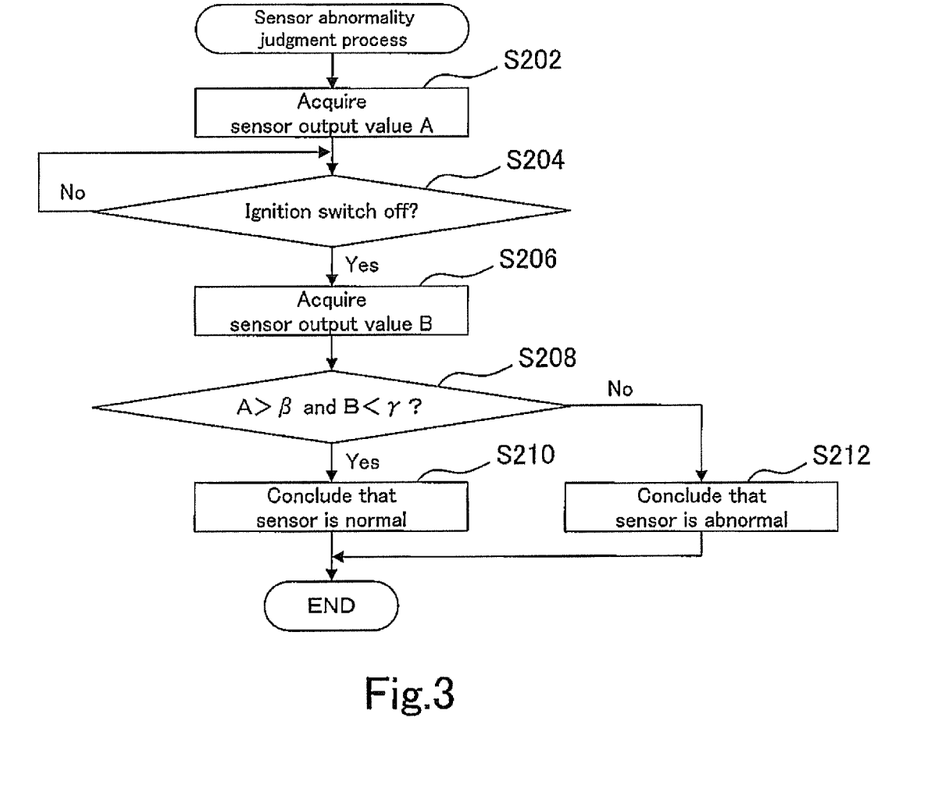
FIG. 3 is a flowchart showing a routine of an abnormality judgment process which is executed by an ECU in a second embodiment of the present invention.

The present embodiment differs from the first embodiment in the functionality of the ECU 50 as the abnormality detection device. More specifically, these two embodiments differ in the method of checking for an abnormality in the ethanol concentration sensor 52. The flowchart of FIG. 3 shows a routine of abnormality judgment process executed by the ECU 50 in the present embodiment. This routine will be explained below.

According to the routine shown in FIG. 3, first, in step S202, the output value of the ethanol concentration sensor 52 is acquired when a certain amount of time has elapsed after internal combustion engine startup (sensor output value A). Next, in step S204, it is judged whether the ignition switch is off. In step S206, which is the next step of the step where the ignition switch is off, the output value of the ethanol concentration sensor 52 is acquired when a certain amount of time has elapsed after the ignition switch is turned off (sensor output value B). The processing steps described so far are the same as those in the first embodiment.

Next, in step S208, the sensor output value A is compared against a threshold value $\beta$ ("a first threshold value" according to the present invention) and the sensor output value B is compared against a threshold value $\gamma$ ("a second threshold value" according to the present invention). The threshold value $\beta$ is set with reference to the minimum value of a normal sensor output value generated when fuel exists between the electrodes of the ethanol concentration sensor 52. The threshold value $\gamma$ is set with reference to a normal sensor output value generated when air exists between the electrodes of the ethanol concentration sensor 52.

If the judgment result obtained in step S208 indicates that the sensor output value A is greater than the threshold value $\beta$ and that the sensor output value B is smaller than the threshold value $\gamma$, it is concluded in step S210 that the ethanol concentration sensor 52 is normal. If, on the other hand, the sensor output value A is not greater than the threshold value $\beta$ or the sensor output value B is not smaller than the threshold value $\gamma$, it is concluded in step S212 that the ethanol concentration sensor 52 is abnormal, or more specifically, stuck.

According to the abnormality judgment process performed in the present embodiment, the validity of each of the two sensor output values A and B is examined. This makes it possible to detect abnormality in the ethanol concentration sensor 52 with higher accuracy compared to the abnormality judgment process performed in the first embodiment.

Third Embodiment

A third embodiment of the present invention will now be described with reference to the accompanying drawings.

Figure 4:
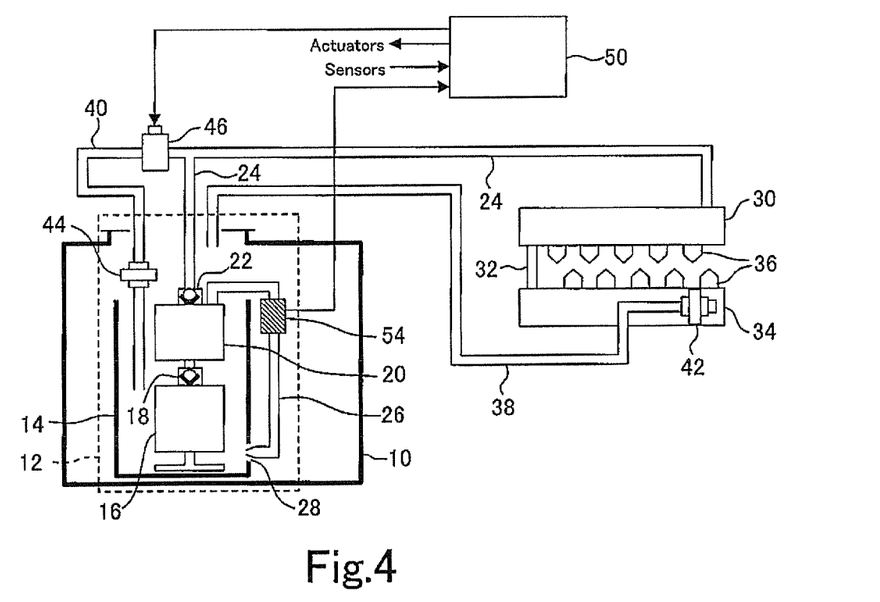
FIG. 4 is a schematic diagram illustrating the configuration of a fuel supply system for an internal combustion engine to which an abnormality detection device of a third embodiment of the present invention is applied.

The abnormality detection device according to the present embodiment is characterized by the configuration of the fuel supply system to which the abnormality detection device is applied. FIG. 4 is a schematic diagram illustrating the configuration of the fuel supply system for an internal combustion engine to which the abnormality detection device according to this embodiment is applied. In FIG. 4, elements identical with those of the fuel supply system shown in FIG. 1 are designated by the same reference numerals.

This embodiment differs from the first embodiment in the location of the ethanol concentration sensor. In this embodiment, the ethanol concentration sensor 54 is disposed in the jet pump flow path 26 in the fuel pump module 12. While the ignition switch is on and the feed pump 16 is operating, part of the pressurized fuel pumped from the feed pump 16 flows into the jet pump flow path 26. This creates a state where fuel exists between the electrodes of the ethanol concentration sensor 54. On the other hand, when the ignition switch is turned off to stop the feed pump 16, fuel flow into the jet pump flow path 26 stops and the jet pump flow path 26 is soon naturally emptied of the fuel by the action of gravity. This creates a state where no fuel exists between the electrodes of the ethanol concentration sensor 54.

Hence, according to the configuration of the fuel supply system of this embodiment, information required for abnormality judgment of the ethanol concentration sensor 54 can be obtained by acquiring the output values of the ethanol concentration sensor 54 of when the ignition switch is on and off. As specific steps of the abnormality judgment process executed by ECU 50, the steps shown in the flowchart of FIG. 2 or the steps shown in the flowchart of FIG. 3 may be adopted.

Fourth Embodiment

A fourth embodiment of the present invention will now be described with reference to the accompanying drawings.

Figure 5:
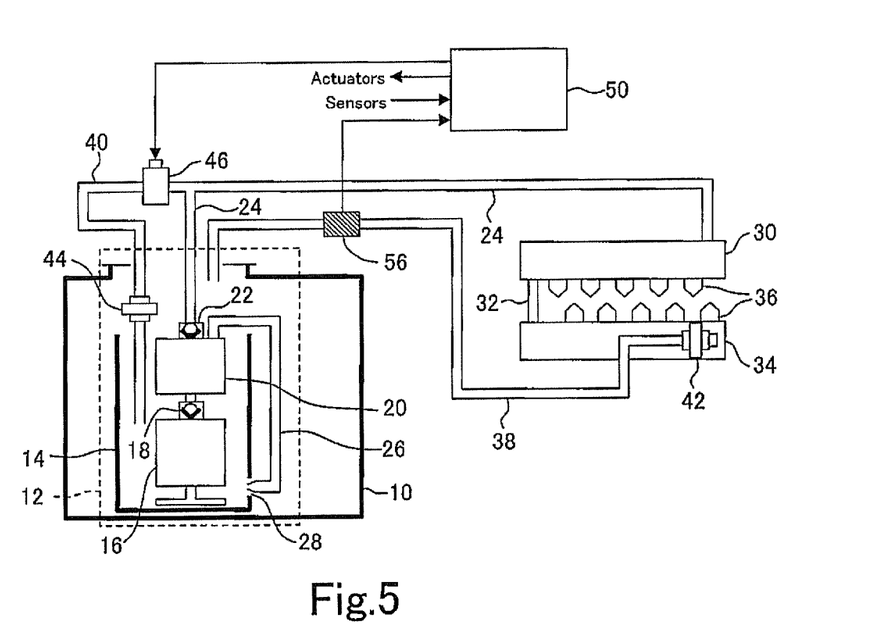
FIG. 5 is a schematic diagram illustrating the configuration of a fuel supply system for an internal combustion engine to which an abnormality detection device of a fourth embodiment of the present invention is applied.

The abnormality detection device according to the fourth embodiment is characterized by the configuration of the fuel supply system to which the abnormality detection device is applied. FIG. 5 is a schematic diagram illustrating the configuration of the fuel supply system for an internal combustion engine to which the abnormality detection device according to this embodiment is applied. In FIG. 5, elements identical with those of the fuel supply system shown in FIG. 1 are designated by the same reference numerals.

This embodiment differs from the first embodiment in the location of the ethanol concentration sensor. In this embodiment, the ethanol concentration sensor 56 is disposed in the first return flow path 38. The flow of fuel in the first return flow path 38 is determined depending on whether the fuel pressure selector valve 46 is opened or closed. While the fuel pressure selector valve 46 is closed, the high pressure regulator 42 opens to let fuel flow into the first return flow path 38. This creates a state where fuel exists between the electrodes of the ethanol concentration sensor 56. On the other hand, while the fuel pressure selector valve 46 is opened, the low pressure regulator 44 opens to leave the high pressure regulator 42 closed. The fuel in the first return flow path 38 then naturally flows out by the action of gravity to create a state where no fuel exists between the electrodes of the ethanol concentration sensor 56.

Hence, according to the configuration of the fuel supply system for this embodiment, the data required for abnormality judgment of the ethanol concentration sensor 52 can be obtained by acquiring the output values of the ethanol concentration sensor 56 of when the fuel pressure selector valve 46 is opened and closed. In the present embodiment, therefore, the ECU 50 as the abnormality detection device performs an abnormality judgment process in accordance with a routine shown in the flowchart of FIG. 6.

Figure 6:
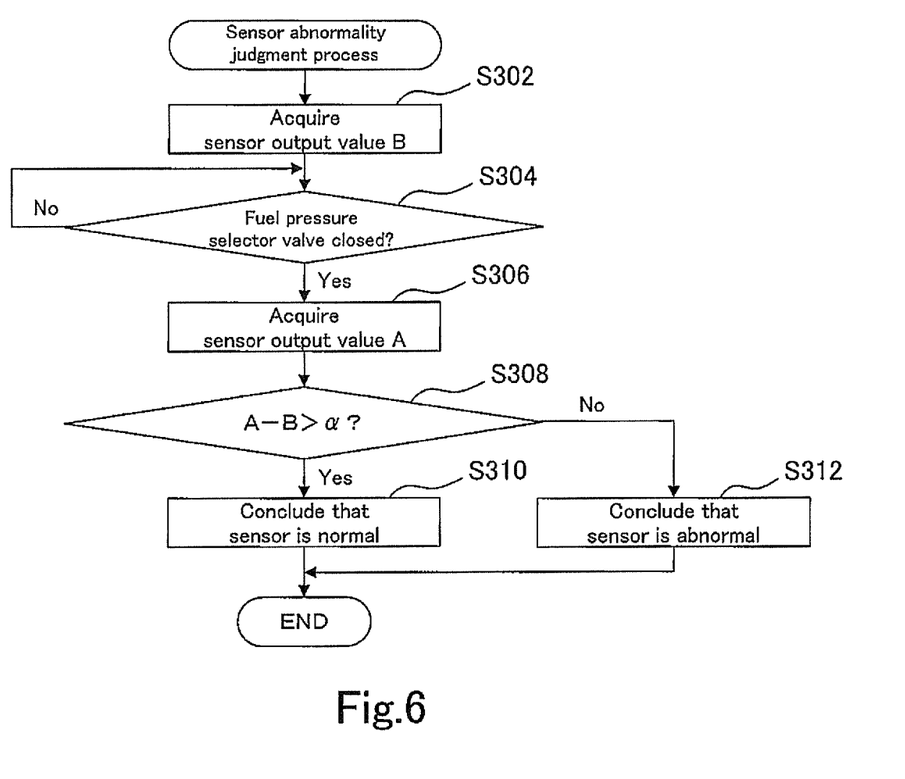
FIG. 6 is a flowchart showing a routine of an abnormality judgment process which is executed by an ECU in the fourth embodiment of the present invention.

The routine shown in FIG. 6 is executed each time the ignition switch is turned on to start the internal combustion engine. In step S302, which is the first step, the output value of the ethanol concentration sensor 56 is acquired when a certain amount of time has elapsed after internal combustion engine startup. The certain amount of time is a time sufficient for raising the fuel pressure so as to open the low pressure regulator 44. Since the fuel pressure selector valve 46 is opened by default, the low pressure regulator 44 opens first of the two pressure regulators 42, 44. The sensor output value acquired in this instance would be a sensor output value indicating absence of fuel between the electrodes of the ethanol concentration sensor 56 ("the second sensor output value" according to the present invention). This sensor output value is hereinafter referred to as a sensor output value B.

Next, in step S304, it is judged whether the fuel pressure selector valve 46 is closed. The fuel pressure selector valve 46 switches between an open state and a closed state in accordance with the operating conditions of the internal combustion engine such as the load and revolving speed. The judgment in step S304 is performed at fixed intervals until the fuel pressure selector valve 46 closes.

In step S306, which is the next step of the step where the fuel selector valve 46 is closed, the output value of the ethanol concentration sensor 56 is acquired when a certain amount of time has elapsed after closure of the fuel pressure selector valve 46. The certain amount of time is a time sufficient for raising the fuel pressure so as to open the high pressure regulator 42 and introduce the fuel into the first return flow path 38. The sensor output value acquired in this instance would be a value indicating presence of fuel between the electrodes of the ethanol concentration sensor 56 ("the first sensor output value" according to the present invention). This sensor output value is hereinafter referred to as a sensor output value A.

In the following step, step S308, the difference between the sensor output value A and sensor output value B is calculated, and is compared against the predetermined reference difference α. The reference difference α is determined as described in connection with the first embodiment.

If the result of comparison in step S308 indicates that the difference between sensor output values A and B is greater than the reference difference α, it is concluded in step S310 that the ethanol concentration sensor 56 is normal. If, on the other hand, the difference between sensor output values A and B is not greater than the reference difference α, it is concluded in step S312 that the ethanol concentration sensor 56 is abnormal, or more specifically, stuck.

The judgment method of step S308 may be substituted by the judgment method of step S208 in the routine shown in FIG. 3. More specifically, comparing the sensor output value A against the threshold value β and comparing the sensor output value B against the threshold value γ are allowable. In this case, if the sensor output value A is greater than the threshold value β and the sensor output value B is smaller than the threshold value γ, it can be concluded that the ethanol concentration sensor 56 is normal. If, on the other hand, the sensor output value A is not greater than the threshold value β or the sensor output value B is not smaller than the threshold value γ, it can be concluded that the ethanol concentration sensor 56 is abnormal.

Fifth Embodiment

A fifth embodiment of the present invention will now be described with reference to the accompanying drawings.

As with the abnormality detection device according to the first embodiment, the abnormality detection device according to the present embodiment is applied to an internal combustion engine having the fuel supply system shown in FIG. 1. Therefore, the subsequent description is based on the system shown in FIG. 1, as with the first embodiment.

The present embodiment differs from the first embodiment in that a function of a rationality diagnostic device is added to the ECU 50. The first embodiment makes it possible to accurately detect whether the ethanol concentration sensor 52 is stuck. However, even when the ethanol concentration sensor 52 is found to be not stuck, it cannot be ensured that the output characteristics of the ethanol concentration sensor 52 are unchanged. The output characteristics of a capacitance sensor such as the ethanol concentration sensor 52 may change due to foreign matter deposited between the electrodes, a corroded electrode surface, or a chipped electrode. In the present embodiment, whether the output characteristics of the ethanol concentration sensor 52 are changed is determined in accordance with the relationship to the output value of another sensor. The another sensor utilized in the present embodiment is an air-fuel ratio sensor (not shown) disposed in an exhaust path of the internal combustion engine.

Figure 7:
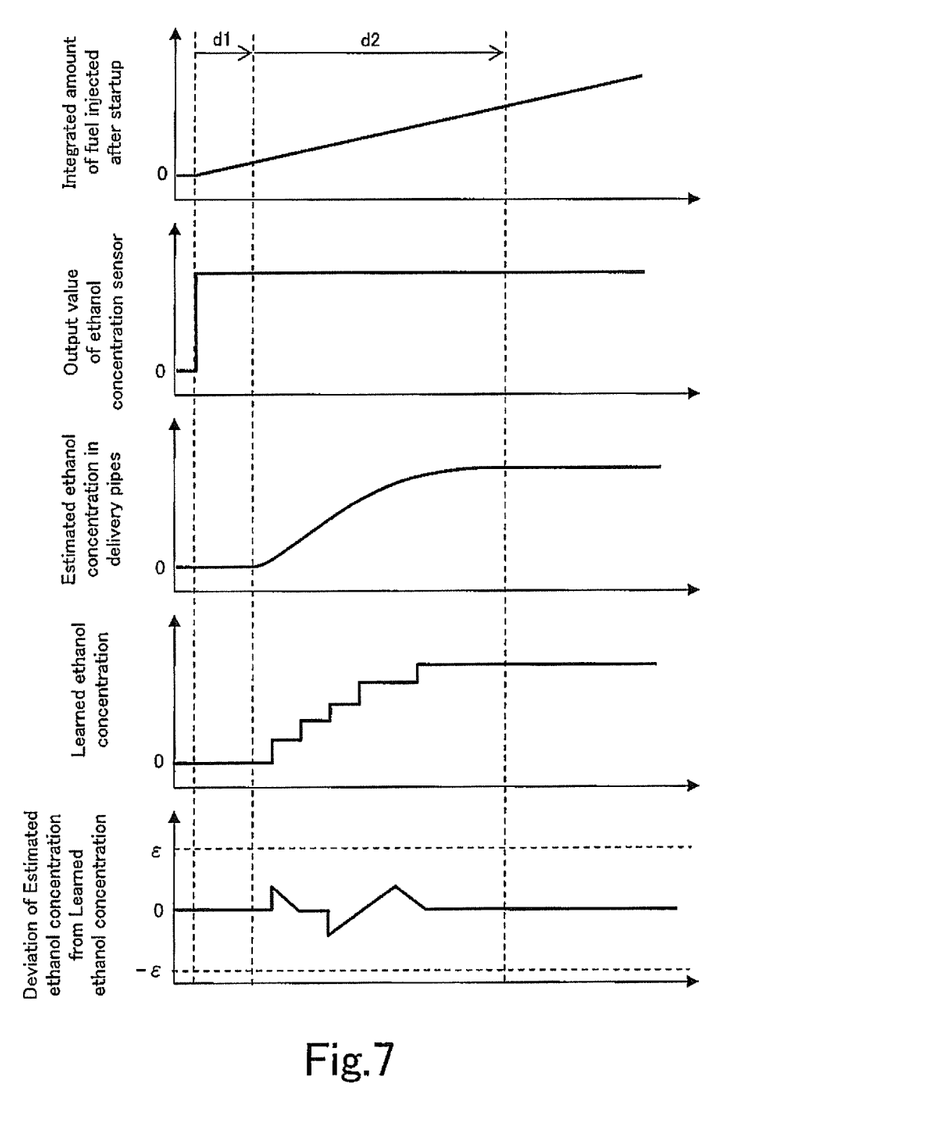
FIG. 7 is a chart showing a process of control during a startup in a fifth embodiment of the present invention.

FIG. 7 shows the process of control during a startup in an internal combustion engine having the fuel supply system shown in FIG. 1. The uppermost chart of FIG. 7 shows temporal changes in the integrated amount of fuel injected from each injector 36 after internal combustion engine startup. The second chart of FIG. 7 shows temporal changes in the output value of the ethanol concentration sensor 52 in a case where refueling had been performed while the internal combustion engine was stopped. This is based on the assumption that the ethanol concentration in the fuel stored in the fuel tank 10 is changed due to refueling. According to the configuration of the fuel supply system shown in FIG. 1, changes in the ethanol concentration in the fuel are reflected in the output value of the ethanol concentration sensor 52 immediately after the feed pump 16 operates.

If the integrated amount of injected fuel and the output value of the ethanol concentration sensor 52 can be acquired, the ethanol concentration in the fuel injected from the injectors 36, that is, the ethanol concentration in the delivery pipes, can be estimated by considering the cubic capacity of the fuel flow path between the fuel tank 10 and each injector 36. The third chart of FIG. 7 shows temporal changes in the estimated ethanol concentration in the delivery pipes. Referring to this chart, the time lag d1 between the change in the output value of the ethanol concentration sensor 52 and the beginning of the change in the estimated ethanol concentration in the delivery pipes represents the time through which an amount of fuel equivalent to the cubic capacity of the main flow path 24 is consumed. The time lag d2 from the beginning of the change in the estimated ethanol concentration in the delivery pipes to the end of the change represents the time through which the fuel in the delivery pipes 30, 34 is completely replaced.

Meanwhile, the aforementioned air-fuel ratio sensor is employed for air-fuel ratio feedback control which is exercised to achieve a target air-fuel ratio. In air-fuel ratio feedback control in an FFV internal combustion engine, the ethanol concentration of the employed fuel is learned in accordance with the deviation between the target air-fuel ratio and the actual air-fuel ratio estimated from the output value of the air-fuel ratio sensor. The fourth chart of FIG. 7 shows temporal changes in the learned value of the ethanol concentration. The learned value varies stepwise since the ethanol concentration is learned at fixed intervals.

If there is no change in the output characteristics of the ethanol concentration sensor 52, the ethanol concentration estimated based on the output value of the ethanol concentration sensor 52 should substantially agree with the ethanol concentration learned based on the output value of the air-fuel ratio sensor. The lowest chart of FIG. 7 shows temporal changes in the deviation between the estimated ethanol concentration and the learned ethanol concentration. This chart indicates that the deviation is within the range of plus and minus $\epsilon$. If $\epsilon$ is the permissible limit value of an error and the deviation is greater than $\epsilon$, it can be concluded that the output value of the ethanol concentration sensor 52 is in doubt, namely, the ethanol concentration sensor 52 has lost its rationality.

Figure 8:
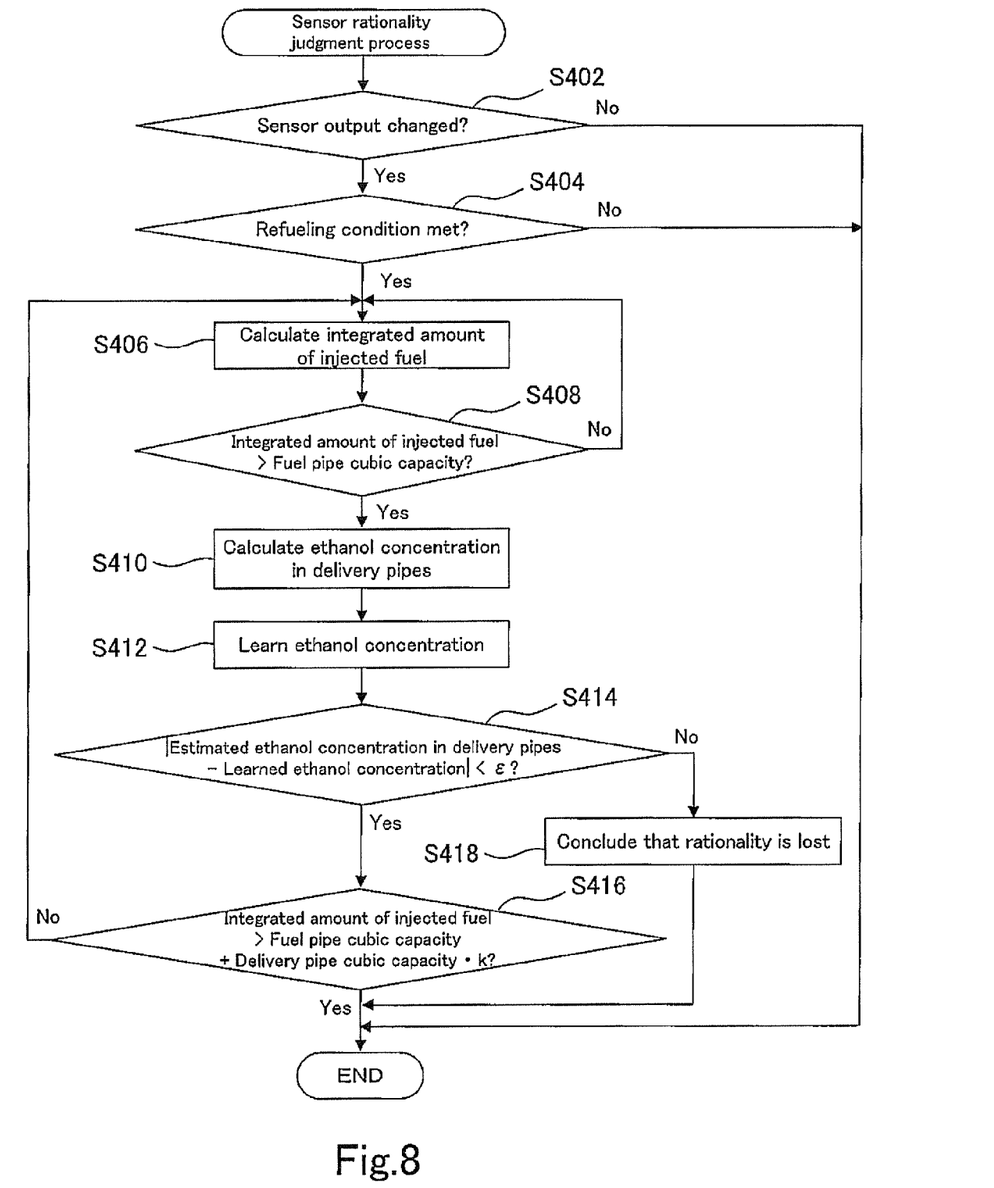
FIG. 8 is a flowchart showing a routine of a rationality judgment process which is executed by an ECU in the fifth embodiment of the present invention.

The routine shown in FIG. 8 is a rationality judgment process routine that is executed by the ECU 50 in this embodiment. This routine is executed each time the ignition switch is turned on to start the internal combustion engine. The routine will be described below.

According to the routine shown in FIG. 8, In step S402, it is judged whether the output value of the ethanol concentration sensor 52 has changed. If the output value has not changed, there is no possibility that a fuel having a different ethanol concentration was supplied to the internal combustion engine while it was stopped. In this case, therefore, the routine then terminates.

If the output value of the ethanol concentration sensor 52 has changed, in step S404, it is judged whether a predetermined refueling condition is met. The refueling condition is a condition that proves that refueling was performed while the internal combustion engine was being stopped. For example, the refueling condition may be an increase in the amount of fuel remaining in the fuel tank 10 measured by a remaining fuel amount sensor, or detection of fuel cap opening by a sensor or switch. If the refueling condition is not met although the output value of the ethanol concentration sensor 52 has changed, there may be a problem that is not to be detected by the routine. In this case, therefore, the routine terminates.

If the output value of the ethanol concentration sensor 52 is changed and the refueling condition is met, the process of step S406 is performed. In step S406, the integrated amount of fuel injected from the injectors 36 is calculated. Then, in step S408, it is judged whether the integrated amount of injected fuel is larger than the cubic capacity of the main flow path 24 (fuel pipe cubic capacity). This judgment step is performed to verify whether a fuel whose ethanol concentration is changed due to refueling has reached the delivery pipe 30. Step S406 is repeatedly performed at predetermined time intervals until the condition in step S408 is met.

If the condition in step S408 is met, each process of steps S410 and S412 is performed. In step S410, an estimated value of the ethanol concentration in the delivery pipes at that moment is calculated by using the integrated amount of injected fuel and the output value of the ethanol concentration sensor 52. In step S412, the learned ethanol concentration value that has been learned based on the deviation between the target air-fuel ratio and the actual air-fuel ratio estimated from the output value of the air-fuel ratio sensor is acquired from a memory.

Next in step S414, the deviation between the estimated ethanol concentration in the delivery pipes calculated in step S410 and the learned ethanol concentration acquired in step S412 is calculated, and then it is judged whether the deviation is smaller than the permissible limit value $\epsilon$ of an error. If the deviation is not greater than $\epsilon$, judgment of step S416 is carried out. In step S416, it is judged whether the integrated amount of injected fuel is greater than the sum of the fuel pipe cubic capacity and a capacity obtained by multiplying the delivery pipe cubic capacity by a predetermined factor "k". The factor "k" is set to two or a greater value, for example, three. This judgment step is performed to verify that the fuel in the delivery pipes 30, 34 is entirely replaced by the newly added fuel. Steps S406 to S414 are repeatedly performed at predetermined time intervals until the condition in step S416 is met. If the condition in step S416 is met while the deviation between the estimated ethanol concentration in the delivery pipes and the learned ethanol concentration is not greater than $\epsilon$, it is concluded that the ethanol concentration sensor 52 is rational and then the routine is terminated.

If, on the other hand, the deviation between the estimated ethanol concentration in the delivery pipes and the learned ethanol concentration exceeds $\epsilon$ before the condition in step S416 is met, the ECU 50 proceeds to step S418 instead of proceeding to step S416. In step S418, it is concluded that the ethanol concentration sensor 52 has lost its rationality and then the routine is terminated.

Performing the rationality judgment process in this embodiment makes it possible to promptly diagnose the rationality of the ethanol concentration sensor 52. This can be achieved because the configuration of the fuel supply system for this embodiment enables a sensor output value based on the ethanol concentration in the fuel tank 10 to be acquired by just driving the feed pump 16 immediately after refueling without starting the internal combustion engine. Further, the same holds true for the configuration of the fuel supply system shown in FIG. 4. Therefore, the above-described rationality judgment method can also be applied to rationality diagnosis for the ethanol concentration sensor 54 of the fuel supply system shown in FIG. 4.

Others

While the present invention has been described in conjunction with the foregoing embodiments, it should be understood that the present invention is not limited to the foregoing embodiments. The foregoing embodiments may be variously modified to implement the present invention without departing from the spirit and scope thereof.

For example, when the fuel pressure selector valve 46 closes before the ignition switch is turned off in the abnormality judgment process according to the first embodiment, the output value of the ethanol concentration sensor 52 may be acquired as a sensor output value B without waiting until the ignition switch is turned off. This is possible because as the fuel pressure selector valve 46 closes, the low pressure regulator 44 closes to create a state where no fuel exists between the electrodes of the ethanol concentration sensor 52.

Further, the two threshold values β, γ used in the abnormality judgment process according to the second embodiment may be identical with each other. In such case, the threshold value should be a value that can clearly distinguish the sensor output value of when fuel exists between the electrodes of the ethanol concentration sensor and the sensor output value of when air exists between the electrodes of the ethanol concentration sensor.

Furthermore, although the foregoing embodiments employ an electrically-operated fuel pump, a mechanical fuel pump driven by the internal combustion engine may alternatively be used. It should be noted that the present invention can also be applied to fuel supply systems that do not have a fuel pressure selector valve and include only one type of pressure regulator.

Although the foregoing embodiments use an ethanol concentration sensor as the fuel property sensor, the type of sensor to be used may be determined in accordance with the employed fuel. If, for instance, the quality of gasoline used in the gasoline engine is to vary, a sensor for judging whether the fuel is heavy or light or a sensor for determining the octane number may be used as the fuel property sensor. Moreover, the fuel property sensor for the present invention is not limited to a capacitance sensor. Sensors other than a capacitance sensor such as an optical refractive-index sensor may also be used as the fuel property sensor as far as they have an output characteristic similar to that described herein.

DESCRIPTION OF REFERENCE NUMERALS

10 Fuel tank
16 Feed pump (fuel pump)
24 Main flow path
26 Jet pump flow path (branch flow path)
28 Jet pump
36 Injector
38 First return flow path (branch flow path)
40 Second return flow path (branch flow path)
42 High pressure regulator (pressure-regulating valve)
44 Low pressure regulator (pressure-regulating valve)
46 Fuel pressure selector valve
50 ECU
52, 54, 56 Ethanol concentration sensor (fuel property sensor)

The invention claimed is:

1. An abnormality detection device for an internal combustion engine whose operation is controlled in accordance with properties of an employed fuel, the abnormality detection device comprising:

a branch flow path branched off from a primary flow path of a fuel flow path connecting a fuel pump to an injector, the branch flow path being such that there is a time where the fuel in the branch flow path flows out between a start of the internal combustion engine and the next start following a stoppage of the internal combustion engine;

a fuel property sensor disposed in the branch flow path, the fuel property sensor generating different output values depending on whether a liquid or a gas exists in a measurement section, and when a fuel exists in the measurement section, the output value is determined in accordance with the properties of the fuel;

first sensor output value acquisition means for acquiring a first sensor output value of the fuel property sensor, the first sensor output value being an output value generated by the fuel property sensor in a situation where the fuel is flowing through the branch flow path;

second sensor output value acquisition means for acquiring a second sensor output value of the fuel property sensor, the second sensor output value being an output value generated by the fuel property sensor in a situation where the fuel in the branch flow path has flown out; and abnormality judgment means for checking for an abnormality in the fuel property sensor by using the first sensor output value and the second sensor output value as abnormality judgment data.

2. The abnormality detection device according to claim 1, wherein the branch flow path is a fuel flow path for guiding the fuel discharged from the primary flow path via a pressure-regulating valve.

3. The abnormality detection device according to claim 1, wherein the branch flow path is a fuel flow path connected to a jet pump for introducing the fuel into a suction opening of the fuel pump.

4. The abnormality detection device according to claim 1, wherein the abnormality judgment means compares the difference between the first sensor output value and the second sensor output value against a predetermined reference difference, and judges, in accordance with the result of the comparison, whether the fuel property sensor is abnormal.

5. The abnormality detection device according to claim 1, wherein the abnormality judgment means compares the first sensor output value against a predetermined first threshold value, compares the second sensor output value against a predetermined second threshold value, and judges, in accordance with the results of the comparisons, whether the fuel property sensor is abnormal.

6. The abnormality detection device according to claim 1, wherein the fuel property sensor is an alcohol concentration sensor for measuring a concentration of alcohol in the fuel, the abnormality detection device further comprising:

alcohol concentration estimation means for estimating an alcohol concentration in the fuel injected from the injector by using an integrated amount of fuel injected by the injector and an output value of the alcohol concentration sensor;

alcohol concentration learning means for learning the alcohol concentration in the fuel that is injected from the injector according to air-fuel ratio feedback control based on an output value of an air-fuel ratio sensor disposed in an exhaust path of the internal combustion engine; and rationality judgment means for judging whether the alcohol concentration sensor is rational by verifying whether the difference between the alcohol concentration estimated by the alcohol concentration estimation means and the alcohol concentration learned by the alcohol concentration learning means is not greater than a predetermined value when the output value of the alcohol concentration sensor is changed due to refueling.

7. An abnormality detection device for an internal combustion engine whose operation is controlled in accordance with properties of an employed fuel, the abnormality detection device comprising:
- a branch flow path branched off from a primary flow path of a fuel flow path connecting a fuel pump to an injector, the branch flow path being such that there is a time where the fuel in the branch flow path flows out between a start of the internal combustion engine and the next start following a stoppage of the internal combustion engine;
- a fuel property sensor disposed in the branch flow path, the fuel property sensor generating different output values depending on whether a liquid or a gas exists in a measurement section, and when a fuel exists in the measurement section, the output value is determined in accordance with the properties of the fuel; and
- a computer that is programmed to:
  acquire a first sensor output value of the fuel property sensor, the first sensor output value being an output value generated by the fuel property sensor in a situation where the fuel is flowing through the branch flow path;
  acquire a second sensor output value of the fuel property sensor, the second sensor output value being an output value generated by the fuel property sensor in a situation where the fuel in the branch flow path has flown out; and
  check for an abnormality in the fuel property sensor by using the first sensor output value and the second sensor output value as abnormality judgment data.

8. The abnormality detection device according to claim 7, wherein the branch flow path is a fuel flow path for guiding the fuel discharged from the primary flow path via a pressure-regulating valve.

9. The abnormality detection device according to claim 7, wherein the branch flow path is a fuel flow path connected to a jet pump for introducing the fuel into a suction opening of the fuel pump.

10. The abnormality detection device according to claim 7, wherein the computer is programmed to compare the difference between the first sensor output value and the second sensor output value against a predetermined reference difference, and judge, in accordance with the result of the comparison, whether the fuel property sensor is abnormal.

11. The abnormality detection device according to claim 7, wherein the computer is programmed to compare the first sensor output value against a predetermined first threshold value, compare the second sensor output value against a predetermined second threshold value, and judge, in accordance with the results of the comparisons, whether the fuel property sensor is abnormal.

12. The abnormality detection device according to claim 7, wherein the fuel property sensor is an alcohol concentration sensor for measuring an concentration of alcohol in the fuel, the abnormality detection device further comprising:
- a second computer that is programmed to:
  estimate an alcohol concentration in the fuel injected from the injector by using an integrated amount of fuel injected by the injector and an output value of the alcohol concentration sensor;
  learn the alcohol concentration in the fuel that is injected from the injector according to air-fuel ratio feedback control based on an output value of an air-fuel ratio sensor disposed in an exhaust path of the internal combustion engine; and
  judge whether the alcohol concentration sensor is rational by verifying whether the difference between the estimated alcohol concentration and the learned alcohol concentration is not greater than a predetermined value when the output value of the alcohol concentration sensor is changed due to refueling.

* * * * *